(12) United States Patent
Yang

(10) Patent No.: US 9,306,439 B2
(45) Date of Patent: Apr. 5, 2016

(54) INCHWORM MOTION LINEAR MOTOR BASED ON ELECTROMAGNETIC CLAMPING MECHANISM

(75) Inventor: Bintang Yang, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 428 days.

(21) Appl. No.: 13/884,949

(22) PCT Filed: Sep. 6, 2011

(86) PCT No.: PCT/CN2011/001512
§ 371 (c)(1),
(2), (4) Date: Jul. 17, 2013

(87) PCT Pub. No.: WO2012/062034
PCT Pub. Date: May 18, 2012

(65) Prior Publication Data
US 2014/0111033 A1    Apr. 24, 2014

(30) Foreign Application Priority Data

Nov. 12, 2010   (CN) .......................... 2010 1 0541650

(51) Int. Cl.
*H02K 41/03*    (2006.01)
*H02K 33/00*    (2006.01)
*H02K 99/00*    (2014.01)

(52) U.S. Cl.
CPC .............. *H02K 33/00* (2013.01); *H02K 57/006* (2013.01)

(58) Field of Classification Search
CPC ... H02K 33/00; H02K 2201/18; H02K 33/16; H02K 41/03

USPC .............................. 310/12.17, 12.31, 90–90.5
See application file for complete search history.

(56) References Cited

U.S. PATENT DOCUMENTS

| 4,152,570 | A | * | 5/1979 | Inoue | B23H 7/28 204/224 M |
| 4,242,606 | A | * | 12/1980 | Nonnenmann | H01F 7/1607 310/12.01 |
| 6,093,989 | A | * | 7/2000 | Joffe | B23Q 5/408 310/103 |
| 6,317,287 | B1 | * | 11/2001 | Yano | G11B 7/08582 310/12.27 |
| 2007/0126300 | A1 | * | 6/2007 | Greywall | H02K 1/24 310/90.5 |
| 2009/0033157 | A1 | * | 2/2009 | Maemura | H02K 41/03 310/12.22 |
| 2009/0218894 | A1 | * | 9/2009 | Aso | F16C 29/0685 310/12.31 |

\* cited by examiner

*Primary Examiner* — Thanh Lam

(57) ABSTRACT

An inchworm motion linear motor based on an electromagnetic clamping device in a technical field of electromagnetic motors includes more than two electromagnetic clamping mechanisms which are arranged in pairs and mutually symmetrically connected. The electromagnetic clamping mechanism includes magnetic field generation devices, rolling bodies, an output shaft and a shell body, wherein the magnetic field generation devices are fixedly arranged outside the shell body; and the shell body and the rolling bodies are sleeved outside the output shaft in sequence. The inchworm motion linear motor based on the electromagnetic clamping device can be manufactured into an electric control super-large clamping force device by sensitively controlling mechanical rigid locking and releasing states with electromagnetically. The clamping device can be manufactured into a driving device or the linear motor with super-large load and precise movement.

8 Claims, 3 Drawing Sheets

(a)

(b)

(a)

(b)

(c)

INCHWORM MOTION LINEAR MOTOR BASED ON ELECTROMAGNETIC CLAMPING MECHANISM

BACKGROUND OF THE PRESENT INVENTION

1. Field of Invention

The present invention relates to a device in a technical field of electromagnetic motors, in particular to an inchworm motion linear motor based on an electromagnetic clamping device.

2. Description of Related Arts

In recent years, the development of electrostrictive and magnetostrictive driving technologies is rapid, and such intelligent materials as huge magnetostrictive materials, electroceramics, magnetostrictive shape memory alloys and the like are produced. Such intelligent materials have the advantages of high energy density, high output power, precise telescopic deformation and the like, so that high-performance drivers and linear motors can be researched and developed based on the intelligent materials. But for the linear motors which are researched and developed based on the intelligent materials, particularly inchworm motion linear motors, the high-output stress performance of the intelligent materials cannot be fully displayed, so that the motors are inapplicable to super-large load driving and transmission fields.

Through the information retrieval of the prior art we find that, according to an essay A hybrid inchworm linear motor that Jaehwan Kim and other persons published on Mechatronics (Journal of Mechatronics, Pages 525 to 542, Issue 12, 2002), the design of the linear motor is based on an inchworm motion mechanism, and the linear motor comprises a magnetostrictive mechanism and two piezoelectric telescopic mechanisms; the magnetostrictive mechanism is used for producing inchworm motion linear displacement, and the two piezoelectric telescopic mechanisms serve as inchworm clamping mechanisms and are used for producing clamping action. According to a piezoelectric clamping mechanism which is adopted in the motor, because a brittle piezoelectric material is used, the anti-extrusion capability is limited, the over clamping force and pressure crush the piezoelectric material, so that a clamping function is lost, and the capability for the magnetostrictive mechanism which drives linearly to produce super-large output stress cannot be realized.

SUMMARY OF THE PRESENT INVENTION

In order to overcome the defects of the prior art, the present invention provides an inchworm motion linear motor based on an electromagnetic clamping device. The inchworm motion linear motor based on the electromagnetic clamping device can be manufactured into an electric control super-large clamping force device by sensitively controlling mechanical rigid locking and releasing states with electromagnetically. The clamping device can be manufactured into a driving device or the linear motor with super-large load and precise movement.

The present invention is realized through the following technical scheme.

An electromagnetic clamping mechanism comprises magnetic field generation devices, rolling bodies, an output shaft and a shell body, wherein the magnetic field generation devices are fixedly arranged outside the shell body; and the shell body and the rolling bodies are sleeved outside the output shaft in sequence.

The section of the shell body is an isosceles trapezoid, a hexagonal structure of mirror symmetry or a spindle shape;

The rolling bodies are made of ferromagnetic materials or ferromagnetic-nonferromagnetic composite materials;

The rolling bodies are more than one ball bearing or roller.

The output shaft is one or more rigid bars, plates, cables or steel cables which are formed by serially connecting middle expansion bodies.

The magnetic field generation devices are any one type of the followings:

(a) two electromagnetic coils which are respectively arranged on both sides of the shell body;

(b) two permanent magnetic bodies which are respectively arranged on both sides of the shell body; and (c) an electromagnetic coil and a permanent magnetic body which are respectively arranged on both sides of the shell body.

An inchworm motion linear motor comprises more than two electromagnetic clamping mechanisms which are arranged in pairs and are formed by symmetrically connected middle expansion bodies. The inchworm motion linear motor has long-distance movement or back-and-forth motion by alternatively controlling one sides of a pair of electromagnetic clamping mechanisms to be clamped and the other sides of the electromagnetic clamping mechanisms to be released.

The present invention works through the following principles.

In an initial state, the output shaft penetrates through the shell body; more than one rolling body are respectively arranged on the upper side and the lower side of the output shaft in the shell body, and the rolling bodies are arranged in the shell body freely. An electromagnetic coil is respectively arranged on the two outer end surfaces of the shell body, the output shaft also penetrates through the two electromagnetic coils, and the shell body is fixed.

When the electromagnetic oil on the left end of the shell body is electrified, the rolling bodies in a free state are absorbed on one side of the inner wall which is close to the shell body due to magnetic attraction. Because the size of a cavity on the inner wall of the left end of the shell body in a direction which is vertical to the moving direction of the output shaft is a little smaller than the sum of the sizes of the output shaft and the rolling bodies on the upper side and the lower side of the output shaft in the same direction, the rolling bodies are clamped between the output shaft and the inner walls of the upper side and the lower side of the shell body but not finally contacted with the left side wall of the shell body when being absorbed. At this time, when the output shaft is dragged to move to the left, the output shaft drives the rolling bodies under the action of friction force, so that the rolling bodies are clamped between the output shaft and the inner walls of the upper side and the lower side of the shell body more tightly, the output shaft is locked by clamping, the locking force increases along with the increase of the dragging force to the left, and the larger the dragging force is the tighter the clamping is. At this time, the output shaft is in a one-way clamping state of moving to the left and being clamped.

When the electromagnetic coil on the left end of the shell body is power off and meanwhile the electromagnetic coil on the right end of the shell body is electrified, the rolling bodies are absorbed on the right end surface of the inner side of the shell body. Because the size of the cavity on the inner wall of the right end of the shell body in the direction which is vertical to the moving direction of the output shaft is a little bigger than the sum of the sizes of the output shaft and the rolling bodies on the upper side and the lower side of the output shaft in the same direction, the rolling bodies are not clamped between the output shaft and the inner walls of the upper side and the lower side of the shell body but finally contacted with the right side wall of the shell body when being absorbed. At this time, the output shaft can be dragged to the left and to the right, and is in a clamping released state.

The components are totally the same. When the shell body becomes a symmetric trapezoid shape, the connection and disconnection principles of the electromagnetic coils are the same with above. When a moving body needs to be restricted to move to the left, the rolling body is attracted to get close to the left inner side wall of the shell body; when the moving body needs to be restricted to move to the right, the rolling body is attracted to get close to the right inner side wall of the shell body, and the output shaft can be clamped bidirectionally. In this case, the output shaft can realize the bi-directional clamping state.

When the components are totally the same, the connection and disconnection principles of the electromagnetic coils are the same with above. When the moving body needs to move to the left, the rolling body is attracted to get close to the right inner side wall of the shell body; when the moving body needs to move to the right, the rolling body is attracted to get close to the left inner side wall of the shell body, and the output shaft can move bidirectionally. In this case, the output shaft can realize the bi-directional release state.

Among the components of the clamping mechanism, any one coil of the electromagnetic coils on both ends of the shell body can be changed into the permanent magnetic body. The clamping and releasing state realization principles are totally the same with the above ones, except that the electromagnetic force which only attracts the rolling of the rolling bodies is the vector resultant force of the magnetic field force which is produced by the electromagnetic coils and the permanent magnetic force. When the rolling bodies need to get close to the inner wall of the shell body on one side of the electromagnetic coil, higher current is fed to the electromagnetic oil so as to produce larger magnetic attraction force which is opposite to the permanent magnetic attraction force to attract the rolling bodies to get close to the side wall of one side of the electromagnetic coil. When the rolling bodies need to get close to the inner wall of the shell body on one side of the permanent magnetic body, lower current or electromagnetic field current in the same direction with a permanent magnetic field is fed into the electromagnetic oil or the power is off, then the permanent magnet attracts force or the electromagnet and the permanent magnet attract force together to attract the rolling bodies to get close to the side wall of one side of the permanent magnetic body. In such a manner, the position of the rolling bodies in the shell body can be controlled through one electromagnetic coil, so that the clamping and the release of the output shaft can be realized. In addition, one-way clamping and limiting devices when the power is off can be realized based on the permanent magnetic force. The permanent magnetic body is arranged on the left side of the shell body, so that the output shaft moves to the left and is restricted by clamping when the power is off. The permanent magnetic body is arranged on the right side of the shell body, so that the output shaft can be always in the released state when the power is off.

When the permanent magnetic bodies are used on both sides of the shell body and the rolling bodies which are distributed symmetrically are arranged in the permanent magnetic bodies, the output shaft is clamped and stays still, and a permanent magnetic force permanent clamping and fixing device can be realized.

Compared with the prior art, the inchworm motion linear motor based on an electromagnetic clamping device has the advantages that (1) the mechanism is simple, the components are few, and huge clamping force can be realized; (2) the control is realized by an electromagnetic signal, so that the clamping and the motion of the motor are controlled sensitively and conveniently; (3) the motor is a basic clamping part and can be widely applied to various fields which need clamping mechanisms; and (4) energy consumption during a clamping driving process is low, and clamping performance without energy consumption is realized.

The mechanism of the invention can be used for developing instruments and equipment which are required to have large-displacement and high-precision driving functions and improving the equipment and the instruments which apply the existing electrostrictive and magnetostrictive driving materials, and can be widely applied to driver (actuator), brake, sensor, motor, vibration and control equipment, robot, precise manufacturing, biomedical engineering and other fields.

BRIEF DESCRIPTION OF THE DRAWINGS

FIG. 3(b) shows the permanent magnetic body arranged on a right side of the shell body.

FIG. 6 is a structural sketch view of the inchworm motion linear motor which is formed by combining two or more electromagnetic clamping mechanisms based on the inchworm motion linear motor and a telescopic expansion body (the moving form of the fixed output shaft of the mechanism), wherein FIG. 6(a) shows two one-way electromagnetic clamping mechanisms and the telescopic expansion body; FIG. 6(b) shows four one-way electromagnetic clamping mechanisms and the telescopic expansion body; and FIG. 6(c) shows two double permanent magnetic clamping mechanisms and the telescopic expansion body.

FIG. 7 is a structural sketch view of the inchworm motion linear motor which is formed by combining two or more electromagnetic clamping mechanisms based on the inchworm motion linear motor and two telescopic expansion bodies (the moving form of the fixed mechanism of the output shaft), wherein FIG. 7(a) shows two one-way electromagnetic clamping mechanisms and the two telescopic expansion bodies; FIG. 7(b) shows four one-way electromagnetic clamping mechanisms and the two telescopic expansion bodies; and FIG. 7(c) shows two double permanent magnetic clamping mechanisms and the two telescopic expansion bodies.

DETAILED DESCRIPTION OF THE PREFERRED EMBODIMENT

Below is the detailed description of the embodiments of the invention, the embodiments are implemented on the premise of the technical scheme of the invention, detailed embodiment methods and specific operation processes are provided, but the protection scope of the invention is not limited to the following embodiments.

Embodiment 1

Figure 1:
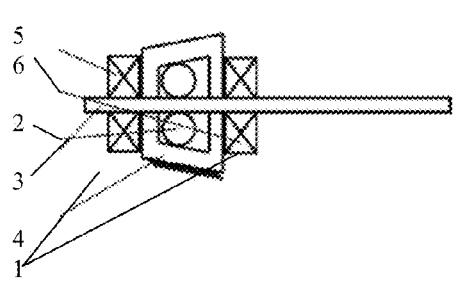
FIG. 1 is a structural sketch view of a one-way electromagnetic clamping mechanism based on an inchworm motion linear motor.

As shown in FIG. 1, the embodiment comprises the magnetic field generation devices 1, the rolling body 2, the output shaft 3 and the shell body 4, wherein the magnetic field generation devices 1 are fixedly arranged outside the shell body 4, and the shell body 4 and the rolling body 2 are sleeved outside the output shaft 3 in sequence.

As shown from FIGS. 1 to 4, the magnetic field generation devices 1 are the two electromagnetic coils 5 and 6 which are respectively arranged on both sides of the shell body 4, the two permanent magnetic bodies 7 which are respectively arranged on both sides of the shell body 4, or the electromagnetic coil 5 and the permanent magnetic body 7 which are respectively arranged on both sides of the shell body 4.

The rolling body 2 is made of the ferromagnetic material or a ferromagnetic-nonferromagnetic composite material.

The output shaft 3 is a single rigid rod, a plate, a pipe body, a cable or a steel cable.

The section of the shell body 4 is in the trapezoidal shape.

In the initial state, the output shaft 3 penetrates through the shell body 4; one rolling body 2 is respectively arranged on the upper side and the lower side of the output shaft 3 in the shell body 4 (as shown in Drawing 1), and the rolling bodies 2 are arranged in the shell body 4 freely. The electromagnetic coil 5 and the electromagnetic coil 6 are arranged on the two outer end surfaces of the shell body 4, the output shaft 3 also penetrates through the two electromagnetic coils, and the shell body 4 is fixed.

As shown in FIG. 1, when the first electromagnetic coil 5 on the left end of the shell body 4 is electrified, the rolling bodies in the free state are absorbed on one side of the left inner wall which is close to the shell body 4 due to magnetic attraction. Because the size of the cavity on the inner wall of the left end of the shell body 4 in the direction which is vertical to the moving direction of the output shaft 3 is a little smaller than the sum of the sizes of the output shaft 3 and the rolling bodies 2 on the upper side and the lower side of the output shaft 3 (as shown in FIG. 1) in the same direction, the rolling bodies 2 are clamped between the output shaft 3 and the inner walls of the upper side and the lower side of the shell body 4 but not finally contacted with the left side wall of the shell body 4 when being absorbed. At this time, when the output shaft 3 is dragged to move to the left, the output shaft 3 drives the rolling bodies 2 under the action of friction force, so that the rolling bodies 2 are clamped between the output shaft 3 and the inner walls of the upper side and the lower side of the shell body 4 more tightly, the output shaft 3 is locked by clamping, the locking force increases along with the increase of the dragging force to the left, and the larger the dragging force is the tighter the clamping is. At this time, the output shaft 3 is in the one-way clamping state of moving to the left and being clamped.

When the first electromagnetic coil 5 on the left end of the shell body 4 is power off and meanwhile the second electromagnetic coil 6 on the right end of the shell body 4 is electrified, the rolling bodies 2 are absorbed on the right end surface of the inner side of the shell body 4. Because the size of the cavity on the inner wall of the right end of the shell body 4 in the direction which is vertical to the moving direction of the output shaft 3 is a little bigger than the sum of the sizes of the output shaft 3 and the rolling bodies 2 on the upper side and the lower side of the output shaft 3 in the same direction, the rolling bodies 2 are not clamped between the output shaft 3 and the inner walls of the upper side and the lower side of the shell body 4 but finally contacted with the right side wall of the shell body 4 when being absorbed. At this time, the output shaft 3 can be dragged to the left and to the right, and is in a clamping released state.

Figure 5:
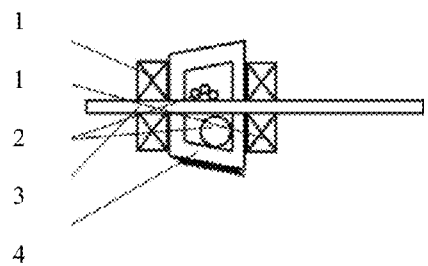
FIG. 5 is a structural sketch view of a pre-work state and a working state of the electromagnetic clamping mechanism based on the inchworm motion linear motor under the action of more than one rolling body.
Figure 5:
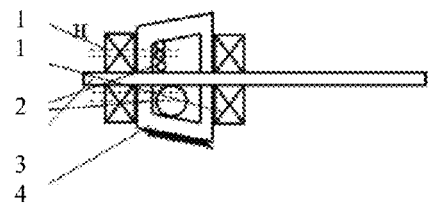

As shown in FIG. 5, the rolling bodies 2 in the embodiment comprise more than one rolling body, and the clamping and releasing states realized by electromagnetic control.

Thus the one-way electromagnetic clamping and releasing states relative to the output shaft 3 are realized.

Embodiment 2

Figure 2:
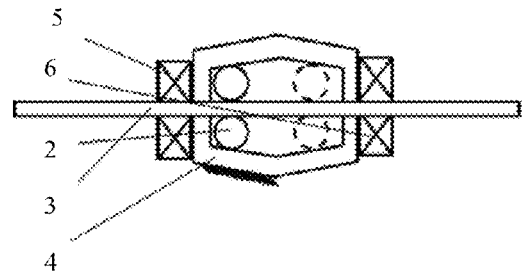
FIG. 2 is a structural sketch view of a bidirectional electromagnetic clamping mechanism based on the inchworm motion linear motor.

As shown in FIG. 2, the section of the shell body 4 in the embodiment is in a spindle shape, specifically in a hexagonal structure in mirror symmetry, the rolling bodies 2 are respectively arranged in the shell body 4 symmetrically, and one or two pairs of rolling bodies 2 are arranged.

The rolling bodies 2 are specifically ball bearings or rollers.

Figure 3:
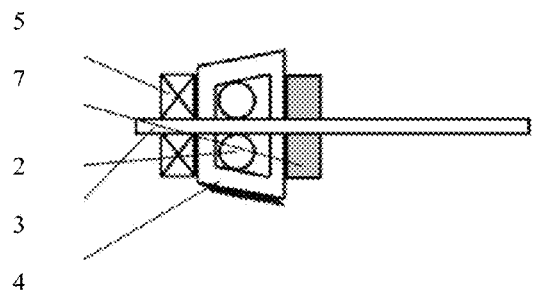
FIG. 3 is a structural sketch view of an electromagnet-permanent magnet-driven electromagnetic clamping mechanism based on the inchworm motion linear motor, wherein FIG. 3 (a) shows a permanent magnetic body arranged on a left side of a shell body
Figure 3:
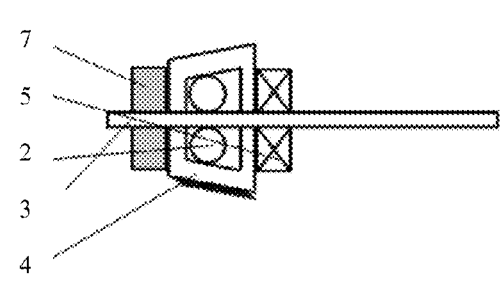
Figure 4:
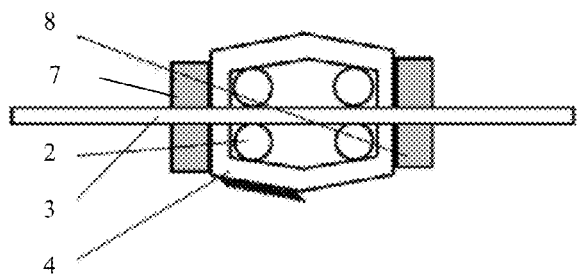
FIG. 4 is a sketch view of a double permanent magnetic clamping-limiting mechanism.

As shown in FIGS. 3 and 4, the clamping and releasing state realization principles are totally the same with the above ones, except that the electromagnetic force which attracts the rolling of the rolling bodies 2 is the vector resultant force of the magnetic field force which is produced by the first electromagnetic coil 5 or the second electromagnetic coil 6 and the permanent magnetic force. When the rolling bodies need to get close to the inner wall of the shell body 4 on one side of the first electromagnetic coil 5 or the second electromagnetic coil 6, higher current is fed to the first electromagnetic coil 5 or the second electromagnetic coil 6 so as to produce larger magnetic attraction force which is opposite to the attraction force of the permanent magnetic body 7 to attract the rolling bodies 2 to get close to the side wall of one side of the first electromagnetic coil 5 or the second electromagnetic coil 6. When the rolling bodies 2 need to get close to the inner wall of the shell body 4 on one side of the permanent magnetic body 7, lower current or electromagnetic field current or current which can produce the electromagnetic field in the same direction with a permanent magnetic field is fed into the first electromagnetic coil 5 or the second electromagnetic coil 6 or the power is off, then the permanent magnet body 7 attracts force or the electromagnet and the permanent magnet attract force together to attract the rolling bodies 2 to get close to the side wall of one side of the permanent magnetic body 7. In such a manner, the positions of the rolling bodies in the shell body 4 can be controlled through the first electromagnetic coil 5 or the second electromagnetic coil 6, so that the clamping and the release of the output shaft 3 can be realized. In addition, the one-way clamping, limiting or releasing of the output shaft when the power is off can be realized based on the attraction force of the permanent magnetic body 7.

As shown in FIG. 3 (a), when the permanent magnetic body 7 is arranged on the left side of the shell body 4, the output shaft 3 moves to the left and is restricted by clamping when the power is off. As shown in FIG. 3 (b), the permanent magnetic body 7 is arranged on the right side of the shell body 4, and the output shaft 3 is always in the released state when the power is off.

Thus the single-one electromagnetic clamping and releasing states under the common action of the electromagnetic coils relative to the output shaft 3 and the permanent magnetic body are realized.

In addition, for the structural form of double permanent magnetic bodies 7 and 8 as shown in FIG. 4, the two pairs of rolling bodies 2 are respectively absorbed on the two inner side walls of the shell body 4 by the permanent magnetic bodies 7 and 8 in the initial state, and the output shaft 3 can realize a non-transformer excitation clamping fixation state.

Embodiment 3

Figure 6:
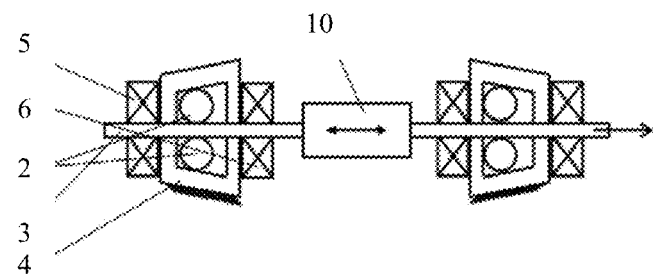
Figure 6:
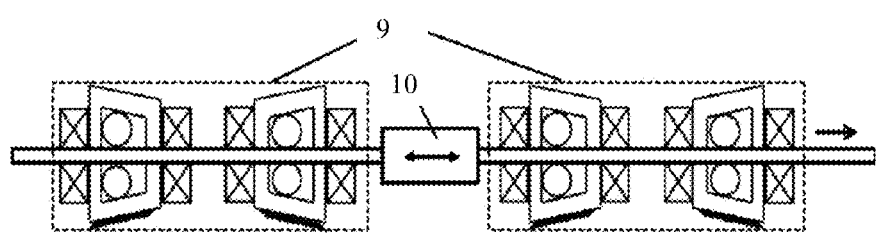
Figure 6:
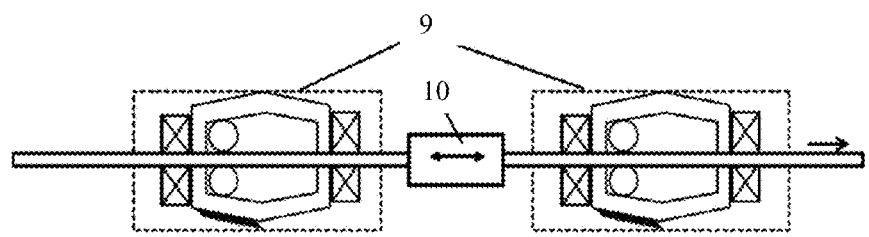
Figure 7:
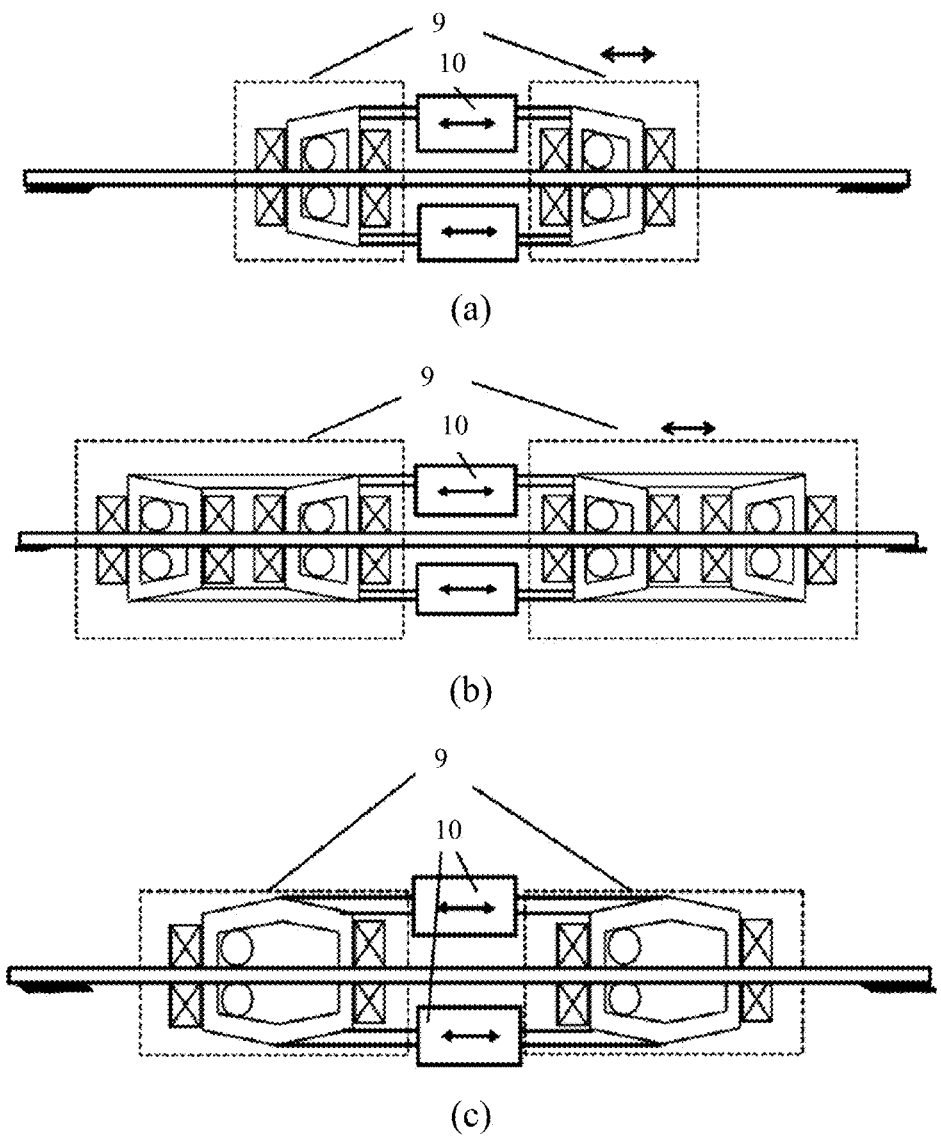

As shown in FIGS. 6 and 7, the embodiment relates to the inchworm motion linear motor comprising more than two electromagnetic clamping mechanisms 9 which are arranged in pairs and are formed by symmetrically connected middle expansion bodies 10. The inchworm motion linear motor has long-distance movement or back-and-forth motion by alternatively controlling one sides of a pair of electromagnetic clamping mechanisms to be clamped and the other sides of the electromagnetic clamping mechanisms to be released.

The output shaft 3 in each electromagnetic clamping mechanism 9 is more than one rigid bar, plate, cable or steel cable which are formed by serially connecting the middle expansion bodies 10.

According to the embodiment, the clamping mechanisms 9 on the left side of the linear motor as shown in FIGS. 6 and 7 are clamped and the clamping mechanisms 9 on the right side of the linear motor as shown in FIGS. 6 and 7 are released through alternative control, and the middle expansion bodies 10 are elongated to push the output shaft 3 on the right end to move to the left end; and then the clamping mechanisms 9 on the right side of the middle expansion bodies 10 are controlled to be clamped, the clamping mechanisms 9 on the left end of the middle expansion bodies 10 are released, then the middle expansion bodies 10 are contracted, and the middle expansion bodies 10 of the motor play the roles of the whole motor at this time due to the clamped right end and the released left end, and movement is to the right along with the contraction of the middle expansion bodies 10. A process is repeated, the single movement displacement of the motor is accumulated and the linear motor capable of moving in a long distance is formed. In addition, the back-and-forth movement of the motor can be realized by controlling the sequence of the clamping of the left end and the right end of the motor.

What is claimed is:

1. An electromagnetic clamping mechanism, comprising magnetic field generation devices, rolling bodies, an output shaft and a shell body, wherein: the magnetic field generation devices are fixedly arranged outside the shell body; the shell body and the rolling bodies are sleeved outside the output shaft in sequence; and the output shaft comprises one or more rigid bars, plates, cables or steel cables which are formed by serially connecting middle expansion bodies.

2. The electromagnetic clamping mechanism as recited in claim 1, wherein the shell body is an isosceles trapezoid or a hexagonal structure of mirror symmetry.

3. The electromagnetic clamping mechanism as recited in claim 1, wherein the magnetic field generation devices comprise one of following:
   (a) two electromagnetic coils which are respectively arranged on both sides of the shell body;
   (b) two permanent magnetic bodies which are respectively arranged on both sides of the shell body; and
   (c) an electromagnetic coil and a permanent magnetic body which are respectively arranged on both sides of the shell body.

4. The electromagnetic clamping mechanism as recited in claim 1, wherein a section of the shell body is an isosceles trapezoid, a hexagonal structure of mirror symmetry or a spindle shape.

5. The electromagnetic clamping mechanism as recited in claim 1, wherein the rolling bodies are made of ferromagnetic materials or ferromagnetic-nonferromagnetic composite materials.

6. The electromagnetic clamping mechanism as recited in claim 1, wherein the rolling bodies are more than one ball bearing or roller.

7. An electromagnetic clamping mechanism, comprising magnetic field generation devices, rolling bodies, an output shaft and a shell body, wherein:
   the magnetic field generation devices are fixedly arranged outside the shell body; the shell body and the rolling bodies are sleeved outside the output shaft in sequence; and the output shaft comprises one or more rigid bars, plates, cables or steel cables which are formed by serially connecting middle expansion bodies;
   the magnetic field generation devices comprise one of following:
   (a) two electromagnetic coils which are respectively arranged on both sides of the shell body;
   (b) two permanent magnetic bodies which are respectively arranged on both sides of the shell body; and
   (c) an electromagnetic coil and a permanent magnetic body which are respectively arranged on both sides of the shell body;
   a section of the shell body is an isosceles trapezoid, a hexagonal structure of mirror symmetry or a spindle shape;
   the rolling bodies are made of ferromagnetic materials or ferromagnetic-nonferromagnetic composite materials;
   the rolling bodies are more than one ball bearing or roller; and
   the shell body is an isosceles trapezoid or a hexagonal structure of mirror symmetry.

8. An inchworm motion linear motor comprising more than two electromagnetic clamping mechanisms as recited in claim 1 which are arranged in pairs and are formed by symmetrically connecting the middle expansion bodies, wherein the inchworm motor linear motor has long-distance movement or back-and-forth motion by alternatively controlling one sides of the electromagnetic clamping mechanisms to be clamped and the other sides of the electromagnetic clamping mechanisms to be released.

* * * * *